UNITED STATES PATENT OFFICE.

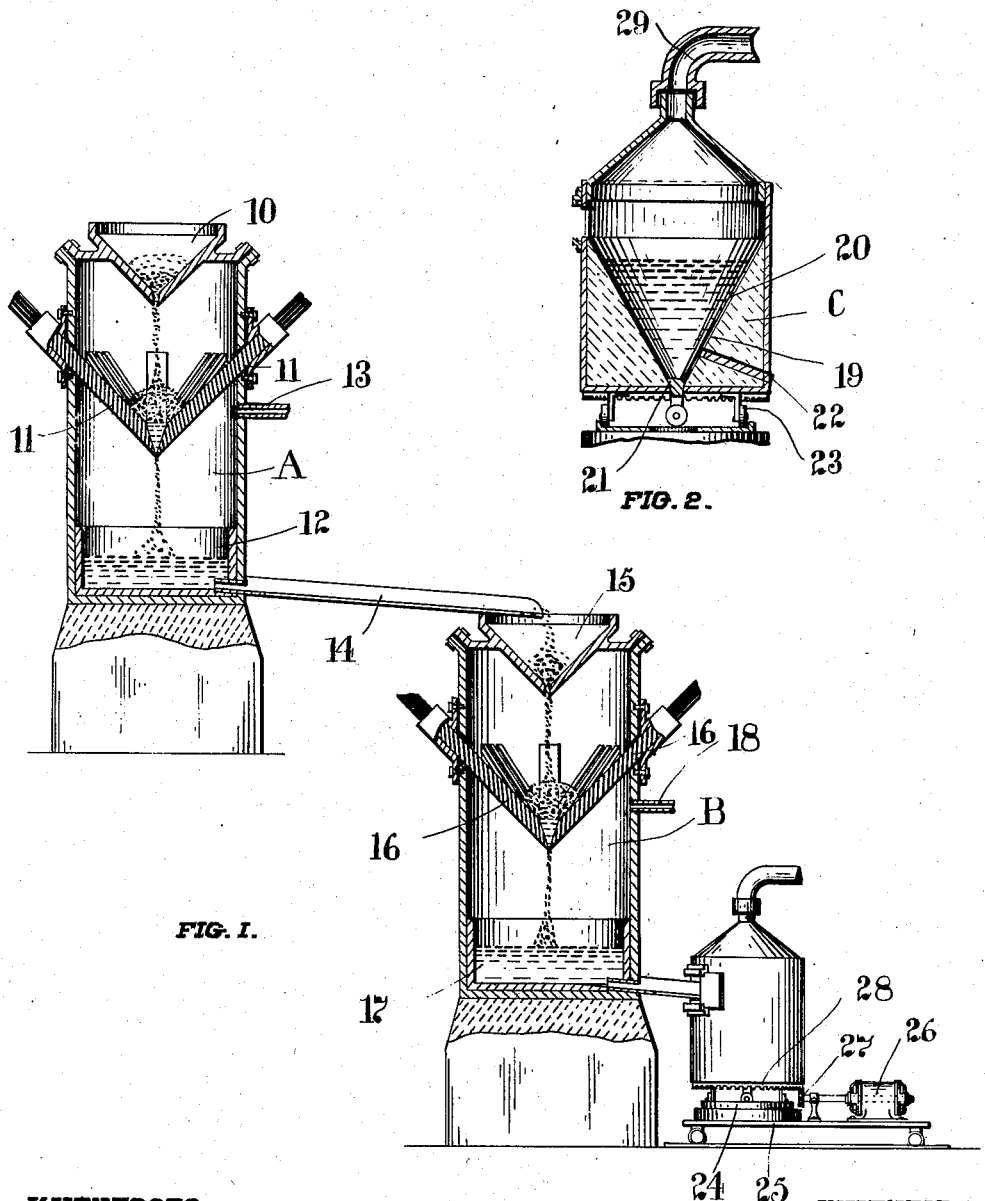

JAMES HENRY REID, OF NEWARK, NEW JERSEY.

PROCESS OF RECOVERING PRECIOUS METALS.

937,387.  Specification of Letters Patent. Patented Oct. 19, 1909.

Application filed February 3, 1909. Serial No. 475,907.

*To all whom it may concern:*

Be it known that I, JAMES HENRY REID, of Newark, in the State of New Jersey, United States of America, have invented certain new and useful Improvements in Processes of Recovering Precious Metals, of which the following is a specification.

My invention relates to an improved process for recovering precious metals, and the objects of my invention are to provide a simple and effective process for recovering precious metals, such as silver, from an ore containing the said metal with baser metals, such as cobalt and nickel, and to provide such a process as will enable the operation to be carried out in a continuous process, in which the metal will be ultimately recovered in its pure form, the steps of the process being described in detail, in the accompanying specification and drawings.

In the drawings, Figure 1 is a sectional elevation of the apparatus employed in carrying out the process. Fig. 2 is a section through the rotary separating tank.

In the drawings, like characters of reference indicate corresponding parts in each figure.

In carrying out the process, the ore containing the precious metal is ground up and mixed with a proportion of a flux, and is then successively subjected to the action of a number of electric arcs, the portions of the ore volatilized during passage between and through the arcs being withdrawn by suitable gas suction.

To illustrate the practical carrying out of the process, an ore containing silver, nickel and cobalt may be given as an example. This ore is first comminuted, and then mixed with a flux which may consist of lead silica and borax. Where there is any oxid in excess in the ore, the addition of carbon may be made to take this up. This ground mixture is then fed into the hopper 10 of the first chamber A, which has electrodes 11 therein, producing a central arc through which the ore will pass, the bottom of the chamber being provided with a settling tank 12 in which the molten mixture will collect. The structure of this furnace is unimportant to the present invention, but the type illustrated is that disclosed in my United States Patent No. 910581 dated Jan. 26th, 1909. At the same time, as the mixture is passing through this arc, the interior of the chamber is exhausted through a suitable outlet pipe 13. While still molten, the mixture is passed through a second chamber B, and in the embodiment illustrated, a trough 14 extends from the settling tank of one chamber, to the hopper 15, on the next, the chamber B being provided with electrodes 16 and settling tank 17 as in the preceding chamber.

If desired, additional amount of flux or fluxing material may be introduced in the hopper 15, while the molten mixture is passing therethrough. The interior of the chamber B is also exhausted through a suitable outlet pipe 18. The molten mixture is passed through as many of these chambers as are deemed necessary to effect thorough scorification of the ore and the resultant mixture is finally run into a rotary separating tank C, which tank is rotated to effect separation by gravity, between the metals. In the embodiment illustrated, this tank consists of a cylindrical casing 19 having a lining 20 of refractory material, the interior of the lining being preferably conical and provided with a tap hole 21 at the bottom and a second tap hole 22, a short distance up the side, the second tap hole being preferably for the outlet of the slag, while the last one 21 is for the withdrawal of the precious metal. This casing is supported by rollers 23 from a suitable track 24 carried on a truck 25, the said truck also carrying an electric motor 26, which has a pinion 27 on the shaft thereof, which meshes with an annular gear 28 on the underside of the tank, the surface of the tank being exhausted through a suitable conducting pipe 29 communicating with the top thereof.

With the ore given as an example, the molten mixture collecting in the separating tank will probably consist of nickel, cobalt, silver and lead silicate compound. The tank is then rotated and the silver having the greatest specific gravity will settle to the bottom and may be withdrawn through the lowest tap hole. The slag will contain nickel, cobalt and lead silicate, and these may afterward be separated in any known manner.

What I claim as my invention is:—

1. The herein-described method of recovering precious metals from an ore containing precious metals with baser metals, which consists in mixing the comminuted ore with a flux; then passing the mixture through an electric arc, while exhausting the volatile products, and then rotating the molten mass of metal and flux to effect separation by gravity between them.

2. The herein-described method of recovering silver from an ore containing silver with nickel and cobalt, which consists in mixing the comminuted ore with lead and a flux; then passing the mixture through an electric arc while exhausting the volatile products, and then rotating the molten mass to effect separation between the silver and the remaining metals.

In witness whereof I have hereunto set my hand in the presence of two witnesses.

JAMES HENRY REID.

Witnesses:
 RUSSEL S. SMART,
 WM. A. WYMAN.